United States Patent
Maekubo et al.

(10) Patent No.: US 8,695,911 B2
(45) Date of Patent: Apr. 15, 2014

(54) WEBBING TAKE-UP DEVICE

(75) Inventors: Yoshiaki Maekubo, Aichi-ken (JP); Masaru Ukita, Aichi-ken (JP); Wataru Yanagawa, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 188 days.

(21) Appl. No.: 13/188,990

(22) Filed: Jul. 22, 2011

(65) Prior Publication Data

US 2012/0032018 A1 Feb. 9, 2012

(30) Foreign Application Priority Data

Aug. 3, 2010 (JP) ................. 2010-174413

(51) Int. Cl.
*B65H 75/48* (2006.01)
(52) U.S. Cl.
USPC ........................ 242/379.1; 242/382
(58) Field of Classification Search
USPC ............... 242/382, 382.5, 383, 383.1, 383.2, 242/383.5, 384, 384.1; 280/805, 806, 807; 297/470–472, 476–478
See application file for complete search history.

(56) References Cited

U.S. PATENT DOCUMENTS

| 5,375,787 A * | 12/1994 | Fujimura et al. | 242/384.5 |
| 6,354,528 B1 * | 3/2002 | Nagata et al. | 242/374 |
| 7,731,117 B2 * | 6/2010 | Yasuda et al. | 242/379.1 |
| 8,240,591 B2 * | 8/2012 | Aihara et al. | 242/374 |
| 2007/0001047 A1 * | 1/2007 | Yasuda et al. | 242/379.1 |
| 2008/0087754 A1 * | 4/2008 | Aihara et al. | 242/374 |

FOREIGN PATENT DOCUMENTS

JP 2007-331563 12/2007

* cited by examiner

*Primary Examiner* — Sang Kim
*Assistant Examiner* — Juan Campos, Jr.
(74) *Attorney, Agent, or Firm* — Roberts Mlotkowski Safran & Cole P.C.

(57) ABSTRACT

A webbing take-up device capable of smoothly releasing rotation locking while also stabilizing a load support direction during rotation locking. A pawl is equipped with a flat plane shaped load receiving face. The pawl is normally retained in a load receiving position but is rotationally moved when imparted with drive force of a drive mechanism section. The lock ring is equipped with a protrusion portion set with a lower rigidity than the rigidity of the pawl. The lock ring is not capable of rotating by the protrusion portion being supported by the load receiving face of the pawl, and rotation is permitted by moving the load receiving face away from the protrusion portion with rotational movement of the pawl.

5 Claims, 4 Drawing Sheets

WEBBING TAKE-UP DEVICE

CROSS-REFERENCE TO RELATED APPLICATION

This application claims priority under 35 USC 119 from Japanese Patent Application No. 2010-174413 filed Aug. 3, 2010, the disclosure of which is incorporated by reference herein.

BACKGROUND OF THE INVENTION

1. Field of the Invention

The present invention relates to a webbing take-up device for taking up webbing fitted across a seated vehicle occupant.

2. Related Art

There are webbing take-up devices configured with capability to set various load limits applied to a webbing belt according to the circumstances (see for example Japanese Patent Application Laid-Open (JP-A) No. 2007-331563). Such devices achieve rotation locking by, for example, normally fitting an engagement protrusion of a lever provided for load limit switching into an engagement recess in a rotation member so as to support rotational load of the rotation member. During an emergency, the engagement portion of the lever is removed from the engagement recess by swinging the lever in response to actuation of a gas generator, so as to release rotation locking.

However, in a configuration such as this, there is room for improvement from the perspective of smoothness of releasing rotation locking while also stabilizing the load support direction during rotational locking.

SUMMARY OF THE INVENTION

In consideration of the above circumstances the present invention is directed towards a webbing take-up device capable of smoothly releasing rotation locking while also stabilizing the load support direction during rotational locking.

A webbing take-up device according to a first aspect of the present invention includes: a spool formed in a cylinder shape on which a webbing belt is wound in layered manner; a torsion shaft housed in an axial center portion of the spool and disposed along an axial direction of the spool, an end portion in the axial direction of the torsion shaft being retained by the spool; a shaft lock section provided at a side of the other end portion in the axial direction of the torsion shaft and being capable of locking the other end portion in the axial direction of the torsion shaft; a drive section that outputs drive force when locking of the other end portion in the axial direction of the torsion shaft is switched by the shaft lock section from a lockable state to a non-lockable state; a pawl that includes a flat plane shaped load receiving face, the pawl being retained in a load receiving position in a normal state and the pawl rotationally moving on being imparted with the drive force from the drive section; and a lock ring formed in a ring shape, at which an engaging portion capable of engaging with the shaft lock section is formed on an inner peripheral face side, and at which a protrusion portion is formed on an outer peripheral face side, the protrusion portion being set with a lower rigidity than a rigidity of the pawl, and making contact with and being supported by the load receiving face in a state where the pawl is retained in the load receiving position, and the lock ring being unable to rotate due to the protrusion portion being supported by the load receiving face, and rotation of the lock ring being permitted by the load receiving face departing from the protrusion portion due to rotational movement of the pawl.

According to the first aspect of the present invention, the pawl is normally (in the normal state) in the load receiving position. The load receiving face contacts with and supports the protrusion portion of the lock ring in this state. The lock ring hence adopts a state incapable of rotation by the protrusion portion being supported on the load receiving face (in a rotation locked state), and displacement of the shaft lock section is restricted when the engaging portion of the lock ring engages with the shaft lock section in this state. The axial direction the other end portion of the torsion shaft is locked by the shaft lock section. Since the axial direction one end portion of the torsion shaft is retained by the spool, the rotational load acts on the lock ring through the torsion shaft and the shaft lock section when both the axial direction the other end portion of the torsion shaft is locked by the shaft lock section and also a rotational force of a specific value or greater is imparted to the spool in the webbing belt pullout direction. Due to the flat plane shape configuration of the load receiving face and the rigidity of the protrusion portion of the lock ring being set lower than the rigidity of the pawl, the load support direction at the load receiving face of the pawl is stabilized when rotational load acts on the lock ring at a time of the lock ring rotation being locked by the pawl, even suppose the protrusion portion of the lock ring was to collapse.

Drive force is output by the drive section when switching the locking of the axial direction the other end portion of the torsion shaft from a lockable state to a non-lockable state using the shaft lock section, and the pawl is rotationally moved by being imparted by the drive force of the drive section. Rotation of the lock ring is accordingly permitted (rotation locking is released) due to the load receiving face of the pawl being moved away (departed) from the protrusion portion of the lock ring by rotational movement of the pawl. Due to the load receiving face of the pawl being configured in a flat plane shape and the rigidity of the protrusion portion of the lock ring being set lower than the rigidity of the pawl, as explained above, there is no concern of the load receiving face of the pawl digging into the lock ring side, and suppressing torque required when releasing the load receiving face of the pawl from the protrusion portion of the lock ring by rotational movement of the pawl. Locking of the axial direction the other end portion of the torsion shaft by the shaft lock section is switched from the lockable state to the non-lockable state by permitting rotation of the lock ring.

A webbing take-up device of a second aspect of the present invention is the configuration of the first aspect wherein the pawl is configured such that a separation distance between a location which is on a surface of the pawl on a side facing the outer peripheral face of the lock ring and which is disposed, with respect to a contact portion contacting with the protrusion portion, further toward a side opposite to a side of a rotational movement direction of the pawl during actuation of the pawl and a center of rotation of the pawl is set shorter than a separation distance between the contact portion and the center of rotation of the pawl.

According to the webbing take-up device of the second aspect of the present invention, the amount of interference between the pawl and the lock ring when the pawl is undertaking rotational movement is suppressed due to that the pawl is configured such that a separation distance between a location which is on a surface of the pawl on a side facing the outer peripheral face of the lock ring and which is disposed, with respect to a contact portion contacting with the protrusion portion, further toward a side opposite to a side of a rotational movement direction of the pawl during actuation of the pawl and a center of rotation of the pawl is set shorter than a separation distance between the contact portion and the center of rotation of the pawl.

The torque required when moving the load receiving face of the pawl away from the protrusion portion of the lock ring by rotational movement of the pawl is accordingly further suppressed.

A webbing take-up device of a third aspect of the present invention is the configuration of the first aspect or the second aspect, wherein a perpendicular line with respect to the load receiving face, at a position of a contact portion where the load receiving face of the pawl and the protrusion portion of the lock ring contact, is set so as to be positioned further toward a side of a rotational movement direction of the pawl during actuation of the pawl than an imaginary line connecting the position of the contact portion and a center of rotation of the pawl.

According to the webbing take-up device of the third aspect of the present invention, the load onto the load receiving face of the pawl from the protrusion portion of the lock ring acts further toward the rotational movement direction side than the imaginary line due to that the perpendicular line with respect to the load receiving face, at the position of the contact portion where the load receiving face of the pawl and the protrusion portion of the lock ring contact, is set so as to be positioned further toward the side of the rotational movement direction of the pawl during actuation of the pawl than an imaginary line connecting the position of the contact portion and the center of rotation of the pawl. The torque required when moving the load receiving face of the pawl away from the protrusion portion of the lock ring by rotational movement of the pawl is accordingly further suppressed.

According to the webbing take-up device of the first aspect of the present invention as explained above the excellent effect is exhibited of enabling rotation locking to be smoothly released while also stabilizing the load support direction during rotation locking.

According to the webbing take-up device of the second aspect of the present invention, by suppressing the amount of interference between the pawl and the lock ring when the pawl is undertaking rotational movement, the torque required when moving the load receiving face of the pawl away from the protrusion portion of the lock ring by rotational movement of the pawl can be suppressed further, and as a result the excellent effect is exhibited of enabling rotation locking to be released even more smoothly.

According to the webbing take-up device of the third aspect of the present invention, by causing the load onto the load receiving face of the pawl from the protrusion portion of the lock ring to act further toward the pawl rotational movement direction side than the imaginary straight line connecting the position of the contact portion and the center of rotation of the pawl, the torque required when moving the load receiving face of the pawl away from the protrusion portion of the lock ring by rotational movement of the pawl can be suppressed further, and as a result the excellent effect is exhibited of enabling rotation locking to be released even more smoothly.

BRIEF DESCRIPTION OF THE DRAWINGS

Exemplary embodiments of the present invention will be described in detail based on the following figures, wherein:

FIG. 4A to FIG. 4C are explanatory diagrams for explaining operation of the switching mechanism shown in FIG. 3.

DETAILED DESCRIPTION OF THE INVENTION

Configuration of an Exemplary Embodiment

Explanation follows regarding a webbing take-up device according to an exemplary embodiment of the present invention, with reference to FIG. 1 to FIG. 4. Where appropriate in the drawings the arrow A indicates a webbing belt take-up rotation direction (take-up direction) and the arrow B indicates a webbing belt pull-out rotation direction (pullout direction).

Figure 1:
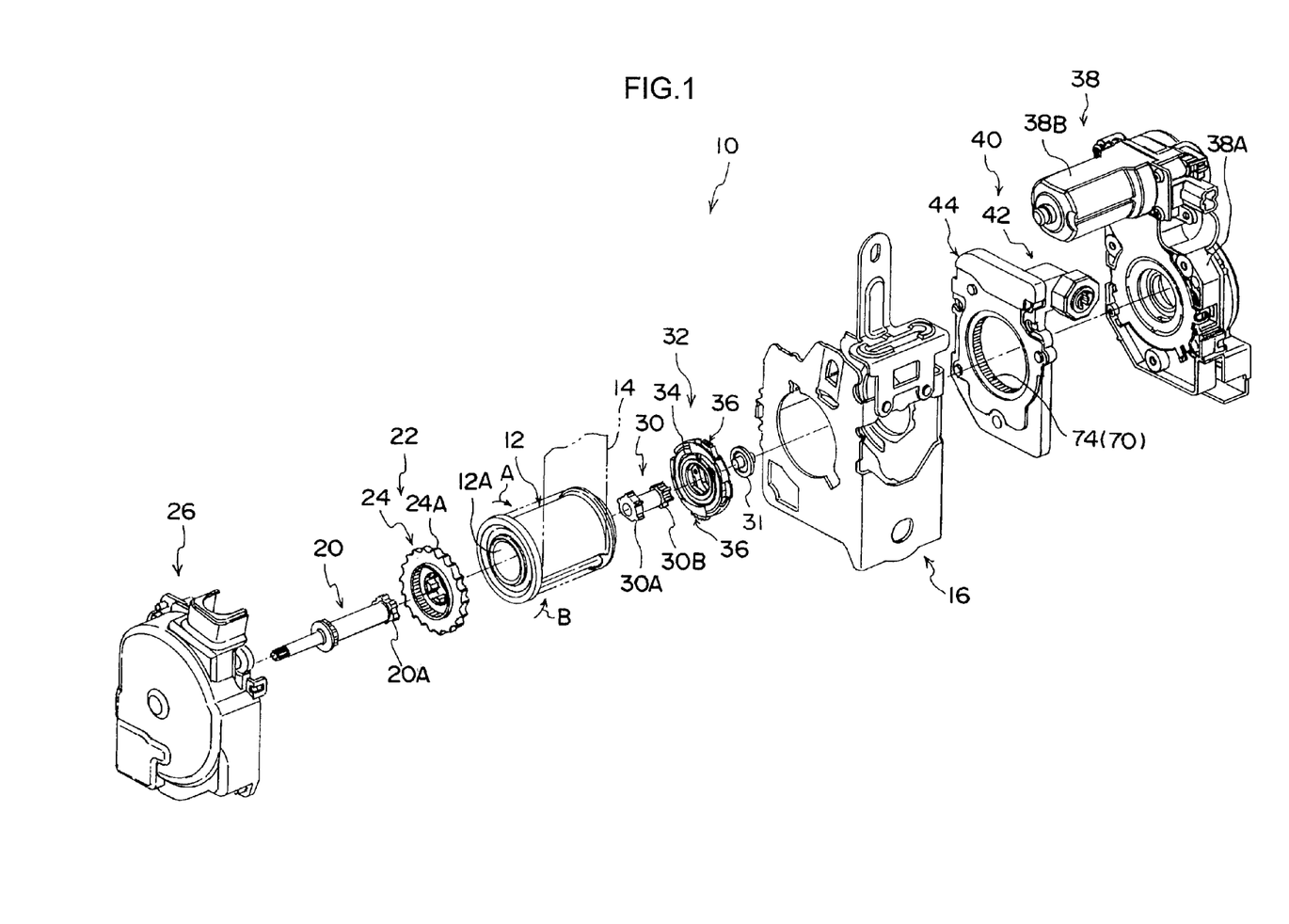
FIG. 1 is an exploded perspective view illustrating a webbing take-up device according to an exemplary embodiment of the present invention.

As shown in FIG. 1, the webbing take-up device 10 according to the exemplary embodiment is equipped with a spool 12 configuring a take-up shaft. As shown in FIG. 1, the webbing take-up device 10 according to the exemplary embodiment is equipped with a spool 12 configuring a take-up shaft. The spool 12 is cast in a substantially circular cylindrical shape so as to have a webbing belt 14 wound in layers thereon. The spool 12 is rotatably supported at both axial direction ends by a frame 16 which is fixed on a vehicle.

A main torsion shaft 20 and a sub torsion shaft 30 (falling within the broad definition of "energy absorbing members") configure a force limiter mechanism and are housed in a through hole 12A at an axial center portion of the spool 12. The main torsion shaft 20 and the sub torsion shaft 30 are disposed next to each other in a straight line manner along the spool 12 axial direction. An end portion 20A on the side of the main torsion shaft 20 facing the sub torsion shaft 30 is retained by an axial direction intermediate portion within the spool 12.

A lock gear 24, configuring a first lock mechanism 22 on the left hand side of the spool 12 in FIG. 1, is attached to an axial direction intermediate portion of the main torsion shaft 20, with the lock gear 24 rendered incapable of relative rotation with respect to the main torsion shaft 20. External ratchet teeth 24A are formed on an outer peripheral portion of the lock gear 24. A lock plate (not shown in the drawings) configuring the first lock mechanism 22 is provided to the frame 16 so as to correspond to the ratchet teeth 24A. The lock plate is capable of moving relative to the ratchet teeth 24A so as to make contact with or move away from the ratchet teeth 24A. In an actuated state of the first lock mechanism 22, by a case where a rapid vehicle deceleration state arises or there is abrupt rotation of the spool 12 in the pullout direction, the lock plate is configured so as to mesh with the ratchet teeth 24A and restrict rotation of the ratchet teeth 24A in the pullout direction.

The lock gear 24 is covered from the side by a sensor cover 26. An acceleration sensor and the like is provided inside the sensor cover 26 for detecting vehicle acceleration. A pretensioner device, not shown in the drawings, is attached to the sensor cover 26. The pretensioner device is a device for moving a piston by actuating a gas generator (gas generating section) at a time of a rapid vehicle deceleration, and for rapidly rotating the spool 12 in the take-up direction by an amount corresponding to the movement stroke of the piston.

An end portion 30A (an axial direction one end portion), at the side facing the main torsion shaft 20, of the sub torsion shaft 30 is retained by an axial direction intermediate portion inside the spool 12. A second lock mechanism 32 is provided as a shaft lock section which is lockable with an axial direction another end portion 30B of the sub torsion shaft 30 on the right hand side of the spool 12 in FIG. 1. The second lock mechanism 32 is disposed at the side of the spool 12 (the side corresponds to the axial direction the other end portion 30B side of the sub torsion shaft 30) by a shaft portion of a screw 31 passing through the second lock mechanism 32 and fastened to the axial direction the other end portion 30B of the sub torsion shaft 30.

Figure 3:
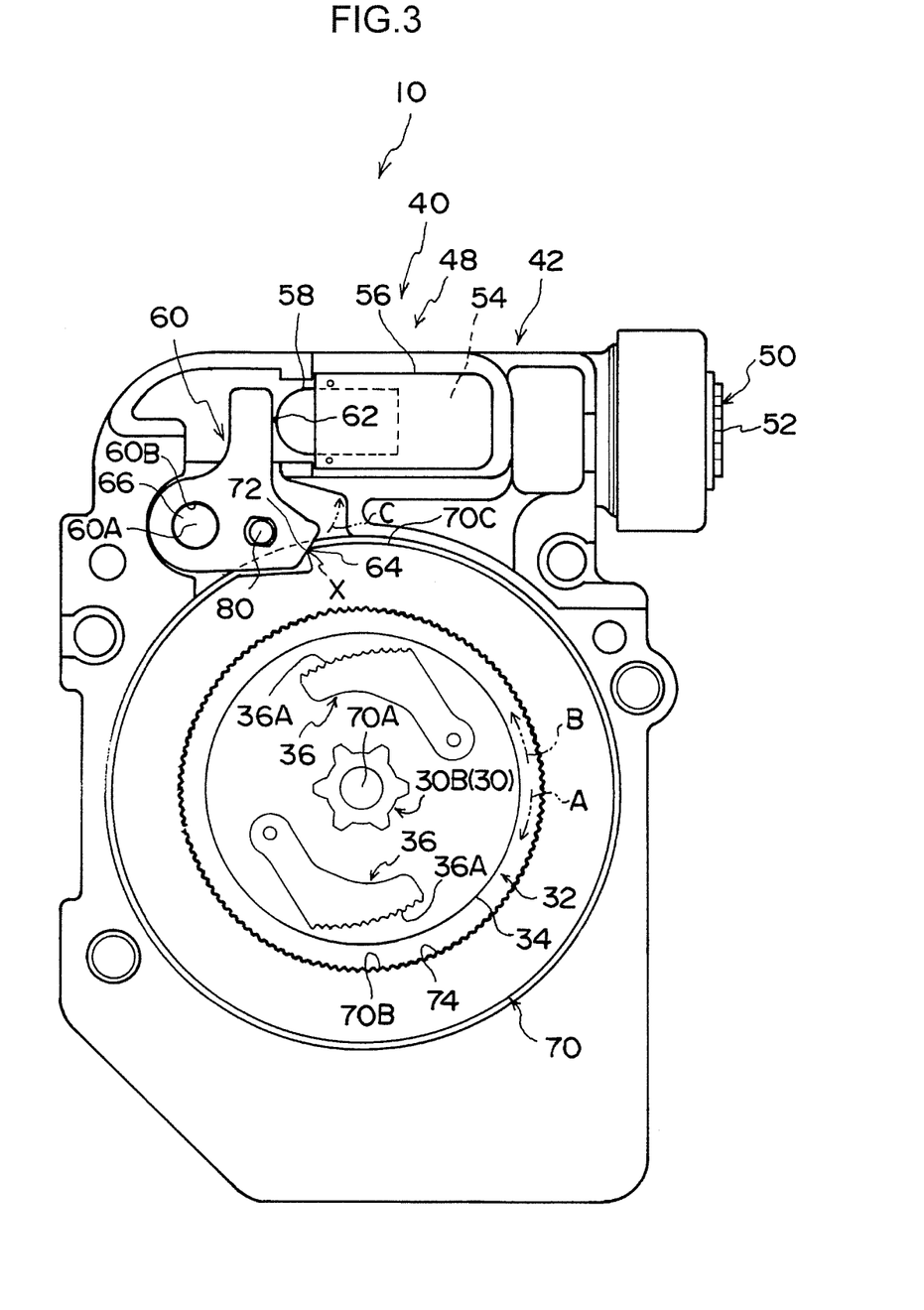
FIG. 3 is a side view illustrating a configuration of a switching mechanism and associated elements of a webbing take-up device according to an exemplary embodiment of the present invention, shown in a state with a sheet removed and with some portions simplified.

FIG. 3 is a diagram illustrating a schematic configuration of the second lock mechanism 32 and a peripheral portion to the second lock mechanism 32 (such as a switching mechanism 40, described later). FIG. 3 is a diagram in which some details of the configuration of the second lock mechanism 32 are omitted, and with the switching mechanism 40 illustrated with a sheet 44, described later, in a detached state.

As shown in FIG. 3, the second lock mechanism 32 is provided with a rotation body 34 that rotates integrally with the sub torsion shaft 30. Clutch plates 36 are attached near the outer peripheral portion of the rotation body 34 so as to be capable of rotating (swinging). The rotation body 34 is rotatably disposed inside an inner peripheral face 70B of a lock ring 70 in the switching mechanism 40. An inside ratchet 74 is formed as an engaging portion on the inner peripheral face 70B side of the lock ring 70.

The clutch plates 36 of the second lock mechanism 32 are engageable with the inside ratchet 74 by rotate-moving towards the radial direction outside of the rotation body 34, causing engaging teeth 36A of the clutch plate 36 to engage with the inside ratchet 74. Rotation of the rotation body 34 towards the pullout direction (the arrow B direction) can be restricted by the engaging teeth 36A of the clutch plates 36 engaging with the inside ratchet 74. While a detailed explanation is omitted, in brief, the second lock mechanism 32 is configured to actuate when the main torsion shaft 20 has undertaken twisting deformation with the first lock mechanism 22 shown in FIG. 1 in the actuated state.

The rotation body 34 of the second lock mechanism 32 and the switching mechanism 40 are covered from the side, such as by a gear housing 38A of a motor mechanism 38 (PSB). A motor 38B and gears (not shown in the drawings) are provided in the gear housing 38A. Based on an electrical signal from an acceleration sensor, the motor mechanism 38 forcibly rotates the spool 12 in the take-up direction with the driving force of the motor 38B. In configurations not disposed with the motor mechanism 38 a cover shaped resin body is disposed in its place.

Figure 2:
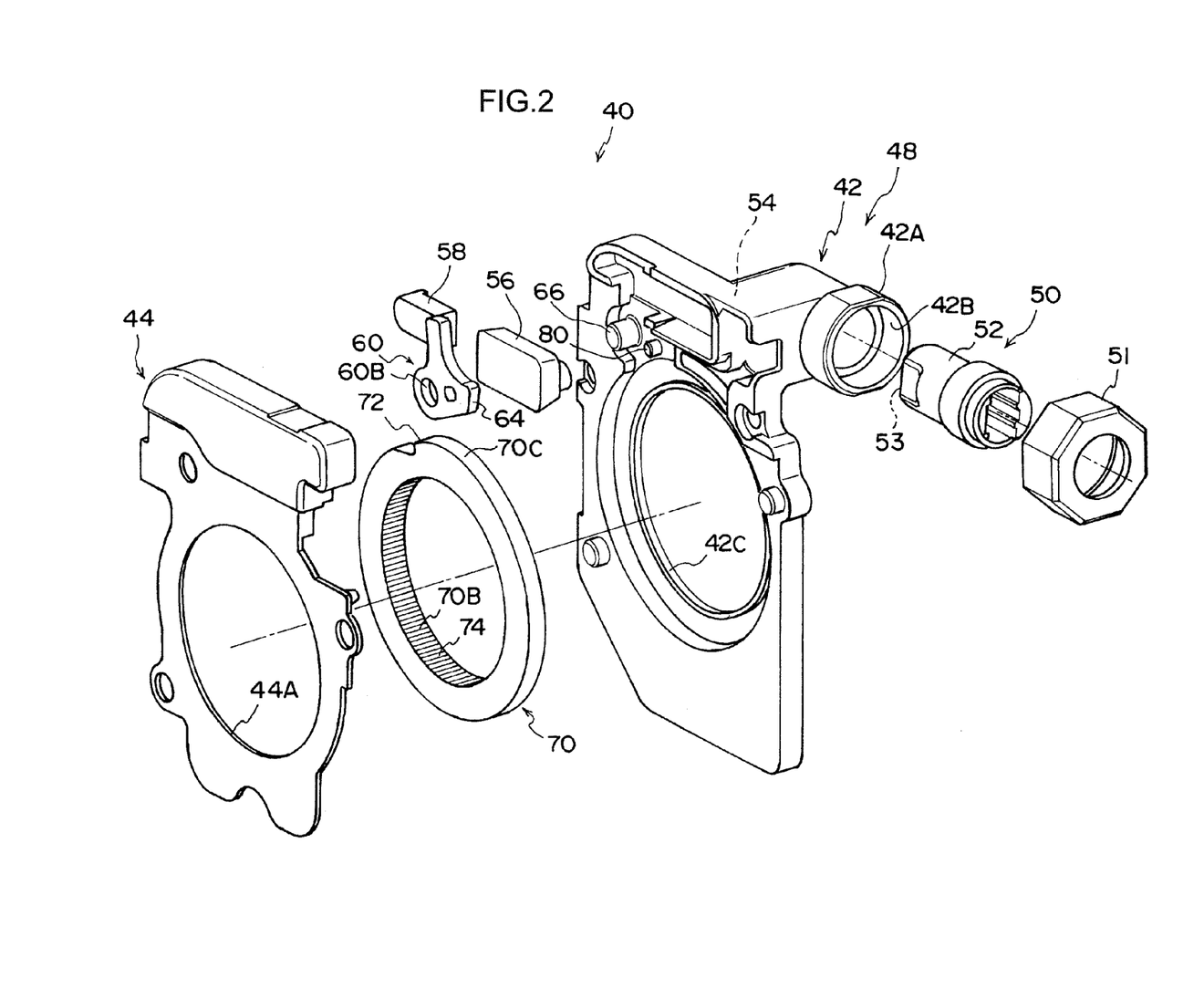
FIG. 2 is an exploded perspective view illustrating a switching mechanism of a webbing take-up device according an exemplary embodiment of the present invention.

FIG. 2 is an exploded perspective view illustrating the switching mechanism 40. As shown in FIG. 2 and FIG. 3, the switching mechanism 40 is provided with a body 42. As shown in FIG. 1, a sheet 44 is attached, at the device width direction inside, to the body 42, and in this state the body 42 is integrally connected to the outside of a side plate of the frame 16. As shown in FIG. 2, a circular hole 42C and a circular hole 44A are respectively formed in the body 42 and the sheet 44 so as to correspond to the inner periphery of the lock ring 70. The circular holes 42C and 44A are disposed substantially coaxially to the spool 12 (see FIG. 1).

As shown in FIG. 2, a generator mounting section 42A is formed at an upper portion of the body 42 in a substantially cylindrical shape. A generator housing hole 42B is formed by a cylinder inside portion of the generator mounting section 42A and a section extending therefrom. A gas generator 50 (micro gas generator, an element falling within the broad definition of a "gas generating section") is inserted into the generator housing hole 42B. The generator 50 is mounted to the generator mounting section 42A with a generator cap 51 in an attached state.

The gas generator 50 is equipped with a hollow shaped casing body 52, with a gas blowing section 53 provided on the leading end face side of the casing body 52, on the left hand side in FIG. 3. While not shown in the drawings, chemical agents such as an ignition agent and a gas generating agent are housed inside the casing body 52, together with an ignition device that ignites the ignition agent when input with an electrical ignition signal. By actuating of the gas generator 50 in this manner, gas is generated inside the casing body 52 so as to blow gas from the gas blowing section 53 of the casing body 52. The ignition device of the gas generator 50 is connected to an ECU (a control device), not shown in the drawings.

The ECU is either directly or indirectly connected to both a danger notification (forecasting) section and to a build (physique) detection section. The danger notification section either directly or indirectly detects when rapid vehicle deceleration occurs or when rapid vehicle deceleration is likely to occur, for example, it includes an acceleration sensor for detecting a rapid vehicle deceleration state, a distance sensor for detecting when the distance to an obstruction in front of the vehicle has become less than a specific value, and the like. The build detection section directly or indirectly detects the build of an occupant seated on a seat, for example, it includes a load (weight) sensor for detecting load acting on the vehicle seat, a belt sensor for detecting when more than a certain amount of the webbing belt 14 has been pulled out from the spool 12 illustrated in FIG. 1, and the like.

The ECU outputs an ignition signal to the ignition device of the gas generator 50 shown in FIG. 2 when the following two conditions are satisfied: the ECU has determined that a rapid vehicle deceleration state has arisen or that a rapid vehicle deceleration state is likely to arise, based on the signal from the danger notification section; and the ECU has determined that the build of the occupant seated on the seat is smaller than a predetermined standard value.

A gas flow path section 54 is formed at an upper portion of the body 42, on the side of the body 42 where the gas blowing section 53 of the generator 50 is disposed. The gas flow path section 54A is inserted in a cylinder 56. A piston 58 is slidably housed in the interior of the cylinder 56. Configuration is made such that the piston 58 is moved by the pressure from gas generated in the generator 50.

In the present exemplary embodiment a drive mechanism section 48, serving as a drive section, in configured including the generator 50, the gas flow path section 54, the cylinder 56, and the piston 58 shown in FIG. 3. The drive mechanism section 48 is configured so as to output drive force when locking of the axial direction the other end portion 30B of the sub torsion shaft 30 by the second lock mechanism 32 is switched from a lockable state to a non-lockable state, according to determination of the ECU.

As shown in FIG. 3, a pressed portion 62 provided at one end side of a substantially L-shaped (a lever shaped) pawl 60 is in contact with a leading end portion of the piston 58. A shaft insertion hole 60B is formed in a curved portion of the pawl 60. The shaft insertion hole 60B is fitted over a small diameter circular pillar shaped pawl support shaft 66 formed so as to project out from an upper portion of the body 42. Namely, the pawl 60 is rotatably supported by the pawl support shaft 66 so as to undertake rotation (swing) movement about the pawl support shaft 66 when imparted with drive force from the drive mechanism section 48. The rotational movement direction of the pawl 60 is set as a direction (the arrow C direction) opposing the webbing belt pull-out rotation direction (the arrow B direction).

A shear pin 80 formed so as to project out from an upper portion of the body 42 is inserted through the pawl 60 at a portion in the vicinity of the other end of the pawl 60. The shear pin 80 restricts the pawl 60 from undertaking rotational movement about the pawl support shaft 66. In other words, the pawl 60 is normally retained by the shear pin 80 in the load receiving position shown in FIG. 3.

The other end of the pawl 60 is formed with a flat plane shaped load receiving face 64. When retained in state with the pawl 60 in the load receiving position, a protrusion portion 72 formed on an outer peripheral face 70C side of the lock ring 70 is in contact (in tangential contact in the present exemplary embodiment) with and supported by the load receiving face 64. The lock ring 70 formed in a ring shape is freely rotatably housed in the body 42. The protrusion portion 72 is formed as a cut-out to a portion on the outer peripheral face 70C side of the lock ring 70 and is set with a rigidity that is lower than that of the pawl 60. The lock ring 70 is not capable of rotating (is rotation locked) due to the protrusion portion 72 being supported by the load receiving face 64 of the pawl 60. Rotation of the lock ring 70 is permitted (rotation lock is released) by the load receiving face 64 moving away (disengaged) from the protrusion portion 72 due to rotational movement of the pawl 60.

Figure 4A:
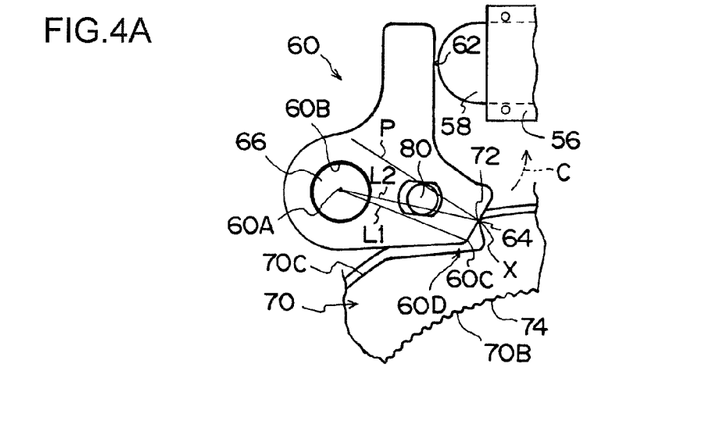
FIG. 4A shows an initial state in which a protrusion portion of a lock ring makes contact with and is supported by a load receiving face of a pawl.

In the present exemplary embodiment, as shown in FIG. 4A, the pawl 60 is configured such that a separation distance (the length of the straight line L1 in FIG. 4A) between a location 60C, this being a location on the pawl 60 on the face on the side facing the outer peripheral face 70C of the lock ring 70 and disposed with respect to the contact point X of the pawl 60 with the protrusion portion 72 further to the opposite direction side (downwards in FIG. 4A) with respect to the rotational movement direction side during actuation of the pawl 60 (the arrow C direction) (further toward the side opposite to the rotational movement direction side during actuation of the pawl 60), and the center of rotation 60A of the pawl 60 is set shorter than a separation distance (the length of the straight line L2 in FIG. 4A) between the contact point X and the center of rotation 60A of the pawl 60.

In the present exemplary embodiment a perpendicular (vertical) line P with respect to the load receiving face 64 at the position of the point of contact X where the load receiving face 64 of the pawl 60 and the protrusion portion 72 of the lock ring 70 contact is also set so as to be positioned further to the rotational movement direction during pawl 60 actuation (arrow C direction) side (the upper side in FIG. 4A) than the imaginary straight line L2 connecting the position of the contact point X to the center of rotation 60A of the pawl 60. Note that the present exemplary embodiment is also configured such that, as shown in FIG. 3, the position of the contact point X between the load receiving face 64 of the pawl 60 and the protrusion portion 72 of the lock ring 70 is further to the upstream side (the right hand side in FIG. 3) in the webbing belt pull-out rotation direction (arrow B direction) of the lock ring 70 than a straight line (not shown in the drawings) connecting the center of rotation 60A of the pawl 60 to the center of rotation 70A of the lock ring 70.

Operation and Effect of the Exemplary Embodiment

Explanation follows regarding the operation and effect of the above exemplary embodiment.

In the webbing take-up device 10 shown in FIG. 1, when the acceleration sensor of the first lock mechanism 22 detects a rapid vehicle deceleration state, or when the spool 12 is abruptly rotated in the pullout direction by the body of an occupant abruptly pulling on the webbing belt 14 fitted over the body as the body of the occupant attempts to move rapidly towards the vehicle front side under inertia during rapid deceleration, first, the lock plate (not shown in the drawings) meshes with the ratchet teeth 24A of the lock gear 24 in the first lock mechanism 22. So, there is in the first lock state in which rotation of the lock gear 24 in the pullout direction is restricted. By restricting rotation of the lock gear 24 in the pullout direction, rotation of the main torsion shaft 20 in the pullout direction is also restricted. Restricting rotation of the main torsion shaft 20 in the pullout direction leads to rotation of the spool 12 in the pullout direction being restricted. The main torsion shaft 20 undertakes twisting deformation when in this state a rotational force is imparted to the spool 12 of a magnitude that exceeds the torsional rigidity of the main torsion shaft 20, resulting in corresponding rotation of the spool 12 being permitted and energy being absorbed.

The second lock mechanism 32 is actuated when the main torsion shaft 20 is deformed by twisting in the first lock mechanism 22 being in the actuated state, the second lock state is achieved with the clutch plate 36 of the second lock mechanism 32 engaging with the inside ratchet 74. The second lock state restricts pullout direction rotation of the rotation body 34 that rotates integrally with the sub torsion shaft 30. Rotation of the sub torsion shaft 30 in the pullout direction is thereby restricted. Due to relative rotation between the sub torsion shaft 30 and the spool 12 being prevented, restricting rotation of the sub torsion shaft 30 in the pullout direction also restricts rotation of the spool 12 in the pullout direction. In this state, the main torsion shaft 20 and the sub torsion shaft 30 both deform by twisting when a rotation force is imparted to the spool 12 in the pullout direction of magnitude exceeding the sum of the torsional rigidities of both the main torsion shaft 20 and the sub torsion shaft 30. Corresponding rotation of the spool 12 is thereby permitted and energy is absorbed.

The second lock mechanism 32 is configured to actuate when the main torsion shaft 20 has been deformed by twisting with the first lock mechanism 22 is in an actuated state, and locking of the other end portion 30B in the axial direction of the sub torsion shaft 30 by the second lock mechanism 32 can be switched from a lockable state to a non-lockable state in accordance with determination by the ECU. When locking of the axial direction the other end portion 30B of the sub torsion shaft 30 by second lock mechanism 32 has been switched from a lockable state to a non-lockable state, rotation of the spool 12 is permitted by a rotation force acting in the pullout direction of magnitude exceeding the torsional rigidity of the main torsion shaft 20.

Specific explanation follows regarding switching locking of the axial direction the other end portion 30B of the sub torsion shaft 30 by the second lock mechanism 32 from a lockable state to a state non-lockable.

First, when the ECU has determined that a rapid vehicle deceleration state has arisen or that a rapid vehicle deceleration state is likely based on the signal from the danger notification section and it has determined that the build of the occupant seated in the vehicle seat is less than a predetermined standard value, the ECU then outputs an ignition signal to the ignition device of the gas generator 50 shown in FIG. 3. Gas is thereby generated in the casing body 52 by the actuation of the gas generator 50, and gas is blown from the gas blowing section 53 (FIG. 2) of the casing body 52 to flow the gas to the gas flow path section 54.

The pressure of the gas flowing in the gas flow path section 54 causes the piston 58 to slide, and when pressed by the piston 58 the pawl 60 performs rotational movement while shearing the shear pin 80, moving the load receiving face 64 of the pawl 60 away (so as to be disengaged) from the protrusion portion 72 of the lock ring 70. Namely, rotational locking of the lock ring 70 is released.

When in this state, suppose the engaging teeth 36A of the clutch plates 36 of the second lock mechanism 32 were to engage with the inside ratchet 74, and a rotation force to be imparted to the spool 12 in the pullout direction of a magnitude exceeding the torsional rigidity of the main torsion shaft 20 (see FIG. 1), the sub torsion shaft 30 and the rotation body 34 would rotate together with the lock ring 70. Namely, locking of the axial direction the other end portion 30B of the sub torsion shaft 30 by the second lock mechanism 32 can be switched from a lockable state to a non-lockable state.

Explanation next follows regarding the rotation locking and release thereof.

The pawl 60 is normally (in normal state) retained in the load receiving position (the position shown in FIG. 3), with the protrusion portion 72 of the lock ring 70 in contact with and supported by the load receiving face 64 in this state. The lock ring 70 is accordingly in a non-rotatable state, and rotation of the second lock mechanism 32 (the rotation body 34) is restricted when the engaging teeth 36A of the clutch plates 36 in the second lock mechanism 32 engage with the inside ratchet 74 of the lock ring 70 in this state. When in this state the axial direction the other end portion 30B of the sub torsion shaft 30 is locked by the second lock mechanism 32 and a rotational force is imparted to the spool 12 (see FIG. 1) in the pullout direction of magnitude exceeding the sum of the torsional rigidities of the main torsion shaft 20 (see FIG. 1) and the sub torsion shaft 30, then a rotation load acts on the lock ring 70 in the pullout direction (the arrow B direction) through the sub torsion shaft 30 and the second lock mechanism 32.

The load receiving face 64 of the pawl 60 is configured in a flat plane shape (flat plane), and the rigidity of the protrusion portion 72 of the lock ring 70 is set lower than the rigidity of the pawl 60. Consequently, when a rotation load acts on the lock ring 70 while the lock ring 70 is locked by the pawl 60, the load support direction at the load receiving face 64 of the pawl 60 is stable even supposing the protrusion portion 72 of the lock ring 70 were to collapse, as shown in FIG. 4B.

Figure 4B:
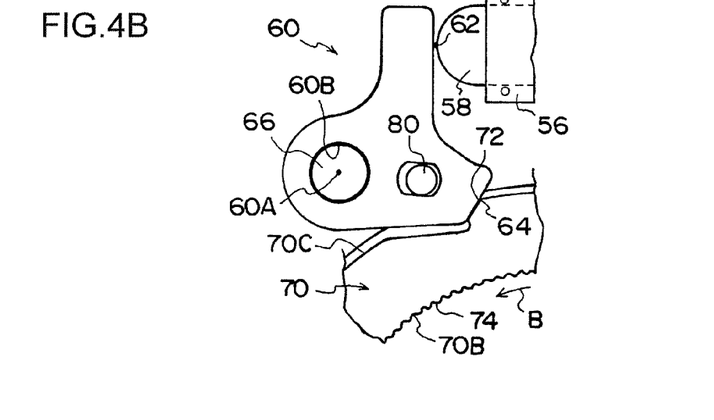
FIG. 4B shows a state in which load from a lock ring protrusion portion side is supported by a load receiving face of a pawl, with the protrusion portion in a collapsed state.
Figure 4C:
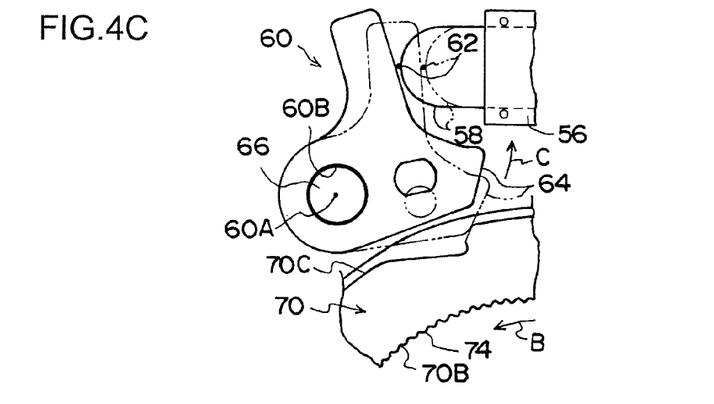
FIG. 4C shows a state just prior to moving a load receiving face of a pawl away from a protrusion portion of a lock ring (shown by double-dashed lines) and a separated state from the protrusion portion of the lock ring (shown in solid lines).

By configuring the load receiving face 64 of the pawl 60 in a flat plane shape and setting the rigidity of the protrusion portion 72 of the lock ring 70 lower than the rigidity of the pawl 60, as described above, there is no concern of the load receiving face 64 side of the pawl 60 digging into the lock ring 70 side when releasing the rotation lock on the lock ring 70, as shown in FIG. 4B and FIG. 4C. Accordingly, torque required when moving the load receiving face 64 of the pawl 60 away from the protrusion portion 72 of the lock ring 70 by rotational movement of the pawl 60 is suppressed.

In the present exemplary embodiment, as shown in FIG. 4A, the pawl 60 is configured such that a separation distance (the length of the straight line L1 in FIG. 4A) between a location 60C, this being a location on the pawl 60 on the face on the side facing the outer peripheral face 70C of the lock ring 70 and disposed with respect to the contact point X of the pawl 60 with the protrusion portion 72 further to the opposite direction side to the rotational movement direction side during actuation of the pawl 60 (the arrow C direction), and the center of rotation 60A of the pawl 60, is set shorter than a separation distance (the length of the straight line L2 in FIG. 4A) between the contact point X and the center of rotation 60A of the pawl 60. Consequently, the amount of interference between the pawl 60 and the lock ring 70 can be suppressed when the pawl 60 performs rotational movement. Torque when the load receiving face 64 of the pawl 60 is moved away (disengaged) from the protrusion portion 72 of the lock ring 70 due to rotational movement of the pawl 60 can accordingly be suppressed using such a structure.

In the present exemplary embodiment a perpendicular (vertical) line P with respect to the load receiving face 64 at the position of the point of contact X where the load receiving face 64 of the pawl 60 and the protrusion portion 72 of the lock ring 70 contact is also set so as to be positioned further to the rotational movement direction during pawl 60 actuation (arrow C direction) side than the imaginary straight line L2 connecting the position of the contact point X to the center of rotation 60A of the pawl 60. Consequently, load on the load receiving face 64 of the pawl 60 from the protrusion portion 72 of the lock ring 70 acts further to the pawl 60 rotational movement direction (the arrow C direction) side than the imaginary straight line L2. Torque required when moving the load receiving face 64 of the pawl 60 away from the protrusion portion 72 of the lock ring 70 by rotational movement of the pawl 60 can accordingly also be suppressed using such a structure.

According to the webbing take-up device 10 of the present exemplary embodiment as explained above, rotation locking of the lock ring 70 can be smoothly released while also stabilizing the load support direction during rotational locking of the lock ring 70 shown in FIG. 3. By enabling rotation locking of the lock ring 70 to be smoothly released good switching of the load acting on an occupant from the webbing belt 14 during a vehicle emergency can be achieved.

Supplementary Explanation to Exemplary Embodiment

Note that the definition of the "flat plane shaped load receiving face" recited in the first aspect 1 not only includes the "load receiving face . . . in a flat plane shape" of the above exemplary embodiment, but also includes faces that are "substantially flat plane shaped load receiving face" and achieve substantially the same operation and effect as that of a load receiving face of flat plane shape.

Furthermore, in the present exemplary embodiment, as shown in FIG. 4A, from the perspective of suppressing the amount of interference between the pawl 60 and the lock ring 70 when the pawl is performing rotational movement for the pawl 60 it is preferable for the pawl 60 to be configured such that the separation distance (the length of the straight line L1 in FIG. 4A) between a location 60C, this being a location on the pawl 60 on the face on the side facing the outer peripheral face 70C of the lock ring 70 and disposed with respect to the contact point X of the pawl 60 with the protrusion portion 72 further to the opposite direction side (downwards in FIG. 4A) to the rotational movement direction side during actuation of the pawl 60 (the arrow C direction), and the center of rotation 60A of the pawl 60 is set shorter than the separation distance (the length of the straight line L2 in FIG. 4A) between the contact point X and the center of rotation 60A of the pawl 60. However configuration may be made, for example, such that the length of the straight line L1 shown in FIG. 4A is set the same length as the straight line L2, or so that the length of the straight line L1 shown in FIG. 4A is set slightly longer than the length of the straight line L2.

Furthermore, in the exemplary embodiment above, from the perspective of making the load to the load receiving face 64 of the pawl 60 from the protrusion portion 72 of the lock ring 70 act further to the pawl 60 rotational movement direction (the arrow C direction) side than the imaginary straight line L2 connecting together the position of the contact point X and the center of rotation 60A of the pawl 60, it is preferable for the perpendicular (vertical) line P with respect to the load receiving face 64 at the position of the point of contact X where the load receiving face 64 of the pawl 60 and the protrusion portion 72 of the lock ring 70 contact to be set so as to be positioned further to the rotational movement direction during pawl 60 actuation (arrow C direction) side (the upper side in FIG. 4A) than the imaginary straight line L2 connecting the position of the contact point X to the center of rotation 60A of the pawl 60. However, configuration may be made for example such that the perpendicular line P of FIG. 4A is set to overlap with the imaginary straight line L2, or for the perpendicular line P of FIG. 4A to be set in a position slightly more to the opposite side to the rotational movement direction (the arrow C direction) side during actuation of the pawl 60 than the imaginary straight line L2.

What is claimed is:

1. A webbing take-up device comprising:
    a spool formed in a cylinder shape on which a webbing belt is wound in layered manner;
    a torsion shaft housed in an axial center portion of the spool and disposed along an axial direction of the spool, an end portion in the axial direction of the torsion shaft being retained by the spool;
    a shaft lock section provided at a side of another end portion in the axial direction of the torsion shaft and being capable of locking the other end portion in the axial direction of the torsion shaft, the shaft lock section including a clutch member;
    a drive section that outputs drive force when locking of the other end portion in the axial direction of the torsion shaft is switched by the shaft lock section from a lockable state to a non-lockable state;
    a pawl that includes a flat plane shaped load receiving face, the pawl being retained in a load receiving position in a normal state and the pawl rotationally moving on being imparted with the drive force from the drive section; and
    a lock ring formed in a ring shape, at which an engaging portion capable of engaging with the clutch member of the shaft lock section is formed on an inner peripheral face side, and at which a protrusion portion is formed on an outer peripheral face side, the protrusion portion being set with a lower rigidity than a rigidity of the pawl, and making contact with and being supported by the load receiving face in a state where the pawl is retained in the load receiving position, and
    the lock ring being unable to rotate due to the protrusion portion being supported by the load receiving face, and rotation of the lock ring being permitted by the load receiving face departing from the protrusion portion due to rotational movement of the pawl.

2. The webbing take-up device of claim 1, wherein the pawl is configured such that a separation distance between a location which is on a surface of the pawl on a side facing the outer peripheral face of the lock ring and which is disposed, with respect to a contact portion contacting with the protrusion portion, further toward a direction opposite to a rotational movement direction of the pawl at a time of actuation of the pawl and a center of rotation of the pawl is set shorter than a separation distance between the contact portion and the center of rotation of the pawl.

3. The webbing take-up device of claim 1, wherein a perpendicular line with respect to the load receiving face, at a position of a contact portion where the load receiving face of the pawl and the protrusion portion of the lock ring contact, is set so as to be positioned further toward a side in a rotational movement direction of the pawl at a time of actuation of the pawl than an imaginary line connecting the position of the contact portion and a center of rotation of the pawl, and wherein the rigidity of the protrusion portion is lower than the rigidity of the load receiving face of the pawl such that any deformation that occurs at an interface between the load receiving face and the protrusion portion during the operation of the webbing take-up device occurs on the protrusion portion and no deformation occurs on the load receiving face.

4. The webbing take-up device of claim 2, wherein a perpendicular line with respect to the load receiving face, at a position of the contact portion where the load receiving face of the pawl and the protrusion portion of the lock ring contact, is set so as to be positioned further toward a side in the rotational movement direction of the pawl at a time of actuation of the pawl than an imaginary line connecting the position of the contact portion and the center of rotation of the pawl, and wherein the pawl includes a single load receiving face.

5. The webbing take-up device of claim 1, wherein the pawl includes a single load receiving face, and the rigidity of the protrusion portion is lower than the rigidity of the load receiving face of the pawl such that any deformation that occurs at an interface between the load receiving face and the protrusion portion during the operation of the webbing take-up device occurs on the protrusion portion and no deformation occurs on the load receiving face.

* * * * *